(12) United States Patent
Nemoto et al.

(10) Patent No.: US 9,236,611 B2
(45) Date of Patent: Jan. 12, 2016

(54) CATHODE MATERIAL FOR LITHIUM ION SECONDARY BATTERY, CATHODE MEMBER, LITHIUM ION SECONDARY BATTERY, AND PRODUCTION METHOD FOR SAID CATHODE MATERIAL

(75) Inventors: Atsushi Nemoto, Hamura (JP); Yuki Matsuda, Ome (JP); Hirokazu Sasaki, Shinagawa-ku (JP)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

(21) Appl. No.: 14/130,201

(22) PCT Filed: Jul. 2, 2012

(86) PCT No.: PCT/JP2012/066844
§ 371 (c)(1),
(2), (4) Date: Dec. 30, 2013

(87) PCT Pub. No.: WO2013/005705
PCT Pub. Date: Jan. 10, 2013

(65) Prior Publication Data
US 2014/0141332 A1    May 22, 2014

(30) Foreign Application Priority Data
Jul. 4, 2011    (JP) .................................. 2011-147896

(51) Int. Cl.
*H01M 4/58* (2010.01)
*C01B 33/32* (2006.01)
(Continued)

(52) U.S. Cl.
CPC ............. *H01M 4/5825* (2013.01); *C01B 33/20* (2013.01); *C01B 33/32* (2013.01); *H01M 4/133* (2013.01); *H01M 4/136* (2013.01); *H01M 4/364* (2013.01); *H01M 4/625* (2013.01); *H01M 10/0525* (2013.01); *Y02E 60/122* (2013.01); *Y02T 10/7011* (2013.01)

(58) Field of Classification Search
CPC .......................... H01M 4/5825; H01M 4/625
USPC .................................. 429/221, 224; 252/506
See application file for complete search history.

(56) References Cited

U.S. PATENT DOCUMENTS

2012/0003139 A1* 1/2012 Kawakami et al. ........... 423/306

FOREIGN PATENT DOCUMENTS

| CN | 101399336 | 4/2009 |
| CN | 101453020 | 6/2009 |

(Continued)

OTHER PUBLICATIONS

International Search Report of PCT/JP2012/066844 dated Sep. 18, 2012.
(Continued)

*Primary Examiner* — Stewart Fraser
*Assistant Examiner* — Rachel L Zhang
(74) *Attorney, Agent, or Firm* — Lucas & Mercanti, LLP

(57) ABSTRACT

Provided is a cathode material for a lithium ion secondary battery that includes a composite grain formed of lithium iron silicate crystals or lithium manganese silicate crystals and a carbon material. The composite grain has a sea-islands structure in which the lithium iron silicate crystals or lithium manganese silicate crystals are scattered like islands in the carbon material, and the islands have an average value of circle-equivalent diameter of smaller than 15 nm.

9 Claims, 3 Drawing Sheets

(51) Int. Cl.
*H01M 4/133* (2010.01)
*H01M 4/136* (2010.01)
*H01M 4/36* (2006.01)
*C01B 33/20* (2006.01)
*H01M 4/62* (2006.01)
*H01M 10/0525* (2010.01)

(56) References Cited

FOREIGN PATENT DOCUMENTS

| | | |
|---|---|---|
| CN | 101540392 | 9/2009 |
| JP | 2001-266882 A | 9/2001 |
| JP | 2002-075364 A | 3/2002 |
| JP | 2003-034534 A | 2/2003 |
| JP | 2003-059491 A | 2/2003 |
| JP | 2003-272632 A | 9/2003 |
| JP | 2004-509447 A | 3/2004 |
| JP | 2004-234977 A | 8/2004 |
| JP | 2006-302671 A | 11/2006 |
| JP | 2007-335325 A | 12/2007 |
| JP | 2009-87682 A | 4/2009 |
| JP | 2009-302044 A | 12/2009 |
| JP | 2011-34776 A | 2/2011 |
| WO | WO 03/077335 A1 | 9/2003 |

OTHER PUBLICATIONS

T. Muraliganth et al; Microwave-Solvothermal Synthesis of Nanostructured $Li_2MSiO_4/C$ (M=Mn and Fe) Cathodes for Lithium-Ion Batteries; American Chemical Society; 2010; pp. 5754-5761.
Bin Shao, Izumi Taniguchi, Proceedings of 50th Symposium of Batteries, (2009).
Bin Shao, Izumi Taniguchi, Proceedings of 51st Symposium of Batteries, (2010).
Yi-Xiao Li, Zheng-Liang Gong, Yong Yang, Journal of Power Sources, 174, (2007) 528-532.
Akira Kojima, Toshikatsu Kojima, Takuhiro Miyuki, Ya5ue Okuyama, Tetsuo Sakai, Proceedings of 51st Symposium of Batteries, (2010)194.
Yuichi Kamimura, Eiji Kobayashi, Takayuki Doi, Shigeto Okada. Jun-ichi Yamaki, Proceedings of 50th Symposium of Batteries, (2009).
J.Moskon, R.Doroinko, R.Cerc-Korosec, M.Gaberscek; J.Jamnik Journal of Power Sources, 174, (2007)638-688.
R.Dominko, M.13ele M.Gaberscek, A.Meden, M.Remskar, J.Jamnik, Electrochem. Commun 8, (2006)217-222.
International Preliminary Report on Patentability with Written Opinion in English and Japanese (9 pages). Date of issuance: Jan. 7, 2014.

* cited by examiner

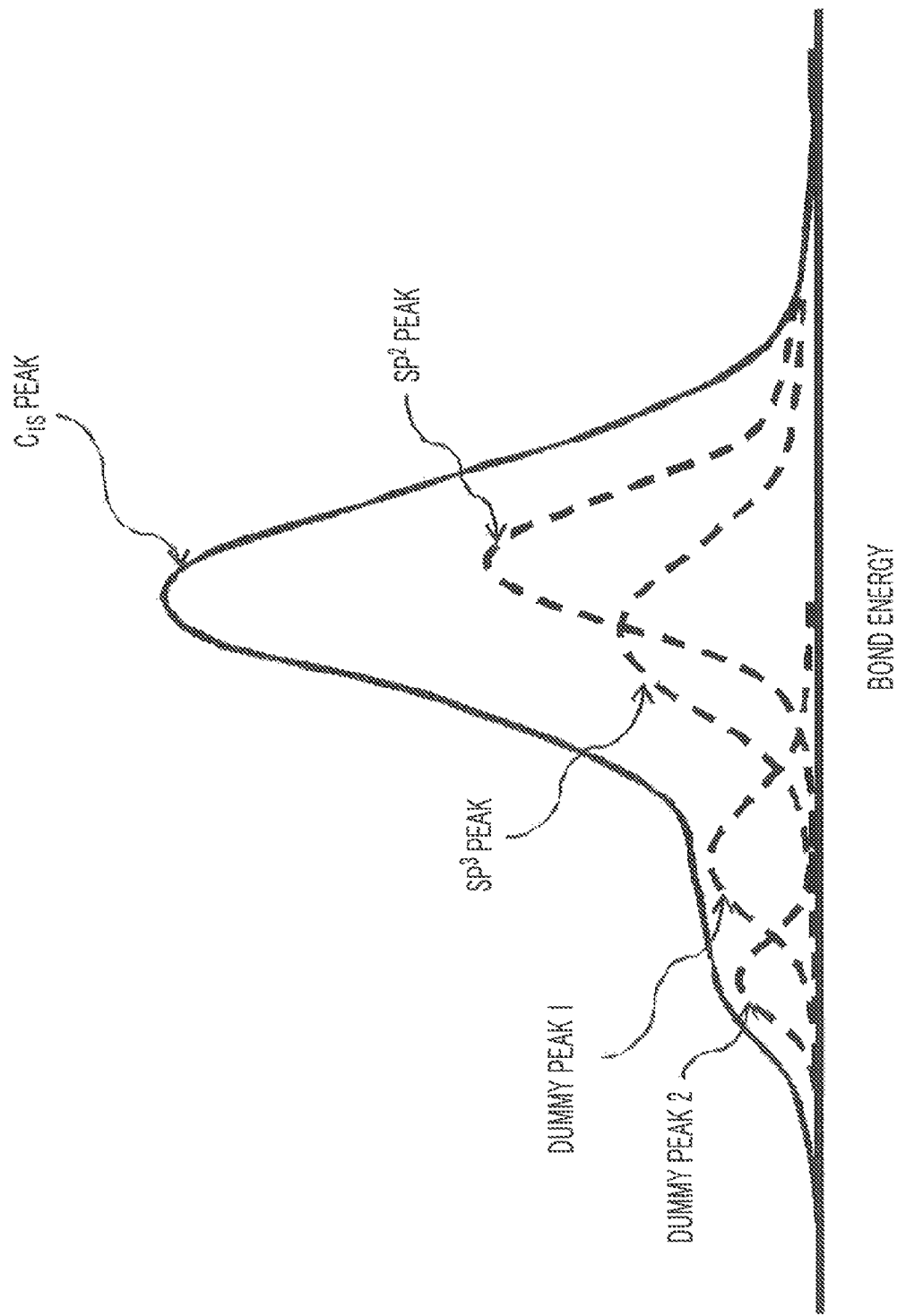

CATHODE MATERIAL FOR LITHIUM ION SECONDARY BATTERY, CATHODE MEMBER, LITHIUM ION SECONDARY BATTERY, AND PRODUCTION METHOD FOR SAID CATHODE MATERIAL

CROSS REFERENCE TO RELATED APPLICATION

This Application is a 371 of PCT/JP2012/066844 filed on Jul. 2, 2012, which claims the priority of Japanese Patent Application No, 2011-147896 filed on Jul. 4, 2011, both applications are incorporated herein by reference in their entirety.

TECHNICAL FIELD

The present invention relates to a cathode material for lithium ion secondary battery, a cathode member and a lithium ion secondary battery using the cathode material, and a method for producing the cathode material.

BACKGROUND ART

Lithium ion secondary battery has lighter weight and larger capacity as compared with conventional lead secondary battery, nickel-cadmium secondary battery and so forth, and has widely been used as a power source for electronic devices such as mobile phone, notebook type personal computer and so forth. It has recently been used also as batteries for electric vehicle, plug-in hybrid car, pedelec and so forth.

The lithium ion secondary battery is basically composed of a cathode, an anode, an electrolyte, and a separator. As the anode, there has been used carbon, lithium titanate and so forth, which allow intercalation and deintercalation of metallic lithium or lithium ion. Meanwhile, a lithium salt and organic solvent or ionic liquid capable of dissolving the lithium salt have been used as the electrolyte. The separator is a component placed between the cathode and the anode so as to keep electrical isolation between the two while allowing the electrolyte to pass through the pores thereof, and is configured by using porous organic resin, glass fiber or the like.

The cathode (also referred to as "cathode layer", hereinafter) is generally configured by an active material which allows intercalation and deintercalation of lithium ion, an electrically conductive auxiliary which ensures an electric conduction path (electron conduction path) to a current collector, and a binder which binds the active material and the electrically conductive auxiliary.

The electrically conductive auxiliary is typically configured by using a carbon material such as acetylene black, carbon black, graphite or the like.

Examples of the active material generally used include metal oxides composed of lithium and transition metal(s) such as $LiCoO_2$, $LiNiO_2$, $LiNi_{0.8}Cu_{0.2}O_2$ and $LiMn_2O_4$, and other known examples include $LiMPO_4$, $Li_2MSiO_4$, $LiMBO_3$ and derivatives obtained from these basic structures by element substitution or compositional change (simply referred to as "derivatives", hereinafter). Now, M mainly contains transition metal element (s) characterized by variable valency, such as Fe, Mn, Ni and Co.

The metal oxide is generally low in electron conductivity. Efforts have therefore been made on improving the electron conductivity of the cathode which uses the metal oxide as the active material, typically by mixing the metal oxide with the above-described electrically conductive auxiliary or by providing a carbon coating or by allowing carbon grain, carbon fiber or the like to adhere on the surface of the metal oxide (Patent Literatures 1 to 6 and Non-Patent Literature 1). In particular, the carbon coating on the surface of the metal oxide has been considered to be effective for the purpose of obtaining excellent battery characteristics.

Among the oxides described above, $Li_2MSiO_4$ represented by iron lithium silicate and manganese lithium silicate and derivatives thereof (they may generally be referred to as "lithium silicate" on occasions) are expected for their theoretically large capacity since they contain two lithium ions in the compositional formulae (Patent Literatures 7 to 9, Non-Patent Literature 2).

CITATION LIST

Patent Literature

Patent Literature 1: JP-2003-34534A
Patent Literature 2: JP-2006-302671A
Patent Literature 3: JP-2002-75364A
Patent Literature 4: JP-2003-272632A
Patent Literature 5: JP-2004-234977A
Patent Literature 6: JP-2003-59491A
Patent Literature 7: JP-2007-335325A
Patent Literature 8: Published Japanese Translation of PCT International Publication No. 2005-519451
Patent Literature 9: JP-2001-266882A

Non-Patent Literature

Non-Patent Literature 1: J. Moskon, R. Dominko, R. Cerc-Korosec, M. Gaberscek, J. Jamnik, *J. Power Sources,* 174, (2007)638-688.
Non-Patent Literature 2: R. Dominko, M. Bele, M. Gaberscek, A. Meden, M. Remskar, J. Jamnik, *Electrochem. Commun.,* 8, (2006)217-222.
Non-Patent Literature 3: Bin SHAO, Izumi TANIGUCHI, *Proceedings of 50th Symposium of Batteries,* (2009)111.
Non-Patent Literature 4: Bin SHAO, Izumi TANIGUCHI, *Proceedings of 51st Symposium of Batteries,* (2010)211.
Non-Patent Literature 5: Yi-Xiao Li, Zheng-Liang Gong, Yong Yang, *J. Power Sources,* 174, (2007)528-532.
Non-Patent Literature 6: Akira KOJIMA, Toshikatsu KOJIMA, Takuhiro MIYUKI, Yasue OKUYAMA, Tetsuo SAKAI, *Proceedings of 51st Symposium of Batteries,* (2010)194.
Non-Patent Literature 7: Yuichi KAMIMURA, Eiji KOBAYASHI, Takayuki DOI, Shigeto OKADA, Jun-ichi YAMAKI, *Proceedings of 50th Symposium of Batteries,* (2009)30.

SUMMARY OF THE INVENTION

Problem to be Solved by the Invention

Lithium silicate represented by iron lithium silicate and manganese lithium silicate and derivatives thereof are theoretically expected to achieve a high level of capacity of 330 mAh/g or around. Not many reports have, however, described achievement of an actual capacity of 1 Li (165 mAh/g) or larger, and no report has described an actual capacity of 1.5 Li (247 mAh/g) or larger. For example, the actual capacity described in Patent Literature 7 is only 60 to 130 mAh/g and the values described in Non-Patent Literatures 6 and 7 are 190 mAh/g and 225 mAh/g at most, respectively.

As described above, the current situation is that lithium silicate has failed to achieve an expected level of high capacity against expectation of its large theoretical capacity even when a battery was actually manufactured and measured.

The present invention was conceived in consideration of this situation and is to provide a cathode material for lithium ion secondary battery which includes a composite grain of lithium silicate crystal represented by $Li_2MSiO_4$ (M represents one or more species of transition metal element including Fe and/or Mn) and a carbon material, the cathode material is capable of obtaining large discharge capacity, a cathode member for lithium ion secondary battery and a lithium ion secondary battery using the cathode material, and a method of manufacturing the cathode material.

Means to Solve the Problem

The present inventors presumed that not only composition of oxide but also external factors such as geometry would largely affect larger actual capacity and found out from diligent investigations that $Li_2MSiO_4$ represented by iron lithium silicate, manganese lithium silicate and derivatives thereof failed in achieving large capacity by simply appropriately adjusting the composition only. Instead, the present inventors succeeded in obtaining large capacity by making them into a specially-shaped composite grain conjugated with a carbon material. The findings led us to complete the present invention.

More specifically, the present inventors found out that a large actual capacity of 1.5 Li or above was obtained when the lithium silicate crystal represented by $Li_2MSiO_4$ (M represents one or more species of transition metal element including Fe and/or Mn) was in the form of composite grain having a sea-islands structure in which the lithium silicate crystals are scattered in the carbon material, and also when the grain size was not larger than the distance along which lithium ion could migrate in solid by following charge/discharge time.

The present invention directed to the above-described goal is summarized as follows.

(1) A cathode material for lithium ion secondary battery, in which the cathode material includes a composite grain formed of a lithium silicate crystal represented by $Li_2MSiO_4$ (M represents one or more species of transition metal element including Fe and/or Mn) and a carbon material. The composite grain has a sea-islands structure in which the lithium silicate crystals are scattered like islands in the carbon material, and the islands have an average value of circle-equivalent diameter of smaller than 15 nm.

(2) The cathode material for lithium ion secondary battery of (1), in which the composite grain has a BET specific surface area of 25 to 110 $m^2/g$.

(3) The cathode material for lithium ion secondary battery of (1) or (2), in which the carbon material shows a $C_{1S}$ peak, observed by X-ray photoelectron spectroscopy, which contains an $SP^2$ peak, an $SP^3$ peak and a shoulder peak located on the higher energy side of the $SP^2$ peak and the $SP^3$ peak.

(4) The cathode material for lithium ion secondary battery of any one of (1) to (3), in which an average value of circle-equivalent diameters of the composite grains is 50 to 500 nm.

(5) The cathode material for lithium ion secondary battery of any one of (1) to (4), in which a content of the carbon material in the composite grain is 2 to 25% by mass.

(6) A cathode material for lithium ion secondary battery, the cathode material comprises a composite grain. The composite grain is obtained by pyrolyzing and reacting a solution, the solution containing, at least, compound(s) which contain elements composing a lithium silicate represented by $Li_2MSiO_4$ (M represents one or more species of transition metal element including Fe and/or Mn) and an organic compound which produces a carbon material while keeping the solution in a form of liquid droplets to produce an intermediate grain, and by heat treatment of the intermediate grain in an inert atmosphere or in a reductive atmosphere at 400° C. or higher and lower than a melting point of the lithium silicate.

(7) The cathode material for lithium ion secondary battery of (6), in which the composite grain is crushed (ground) prior to the heat treatment.

(8) A cathode member for lithium ion secondary battery which includes the cathode material for lithium ion secondary battery described in any one of (1) to (7).

(9) A lithium ion secondary battery which includes the cathode material for lithium ion secondary battery described in any one of (1) to (7).

(10) A method for manufacturing a cathode material for lithium ion secondary battery, the method includes a use of a composite grain. The composite grain is obtained by pyrolyzing and reacting a solution, the solution containing, at least, compound(s) which contain elements composing a lithium silicate represented by $Li_2MSiO_4$ (M represents one or more species of transition metal element) and an organic compound which produces a carbon material while keeping the solution in a form of liquid droplets to produce an intermediate grain, and by heat treatment of the intermediate grain in an inert atmosphere or in a reductive atmosphere at 400° C. or higher and lower than a melting point of the lithium silicate.

Advantageous Effects of the Invention

According to the present invention, it is now possible to obtain an excellent cathode material for lithium ion secondary battery having large actual capacity. By using the cathode material, it is now also possible to obtain a cathode member for lithium ion secondary battery and a lithium ion secondary battery having large actual capacity.

BRIEF DESCRIPTION OF DRAWINGS

FIG. 3 is an exemplary $C_{1S}$ peak observed by XPS, and peak separation.

EMBODIMENTS OF THE INVENTION

The cathode material for lithium ion secondary battery of the present invention contains a composite grain in which the lithium silicate crystal represented by $Li_2MSiO_4$ (M represents one or more species of transition metal element including Fe and/or Mn) conjugates with a carbon material, and shows a so-called, sea-islands structure in which a plurality of regions composed of the lithium silicate crystal (referred to as "island", hereinafter) are scattered in a discrete manner, and the carbon material lies as a bulk (matrix) between the islands, when observed under a transmission electron microscope.

In this patent specification, lithium silicate means a metal oxide represented by $Li_2MSiO_4$ and is typically iron lithium silicate ($Li_2FeSiO_4$) and manganese lithium silicate ($Li_2MnSiO_4$). The present invention, however, not limited thereto and instead includes derivatives derived from these basic structures by element substitution or compositional change. M is selectable from transition metal elements including at least either Fe or Mn. The transition metal elements other than Fe and Mn include Co, Ni, Cu, and the Group XII element including Zn.

Figure 1:
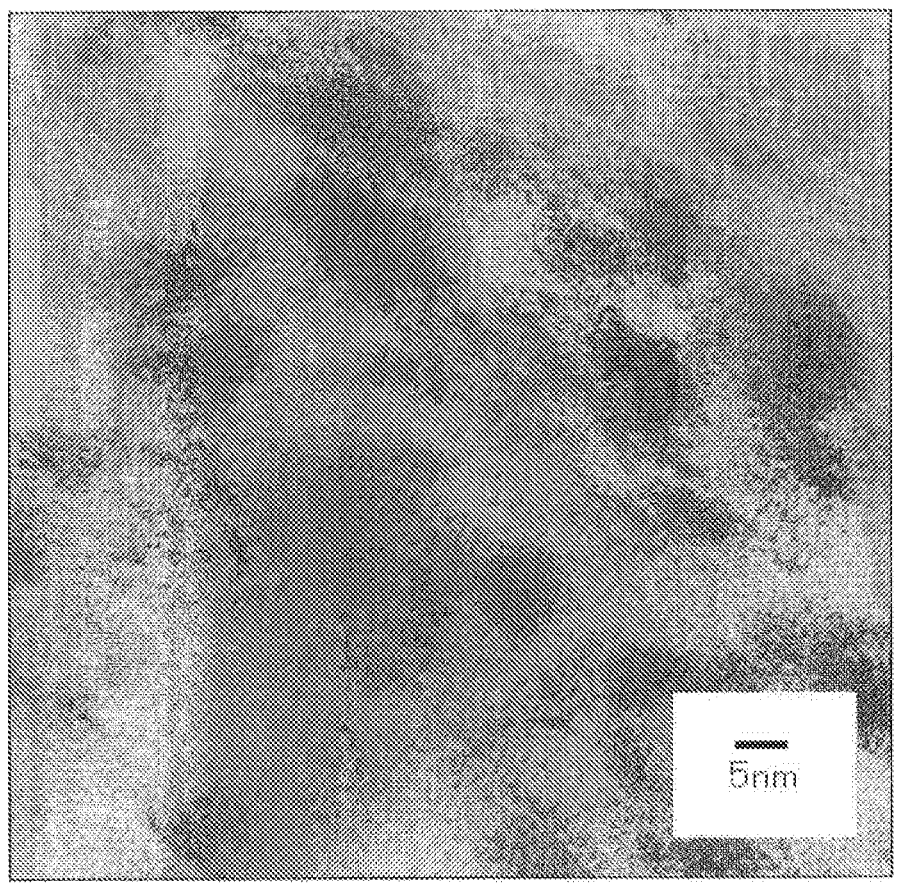
FIG. 1 is a TEM image of a sea-islands structure relevant to the present invention.
Figure 2A:
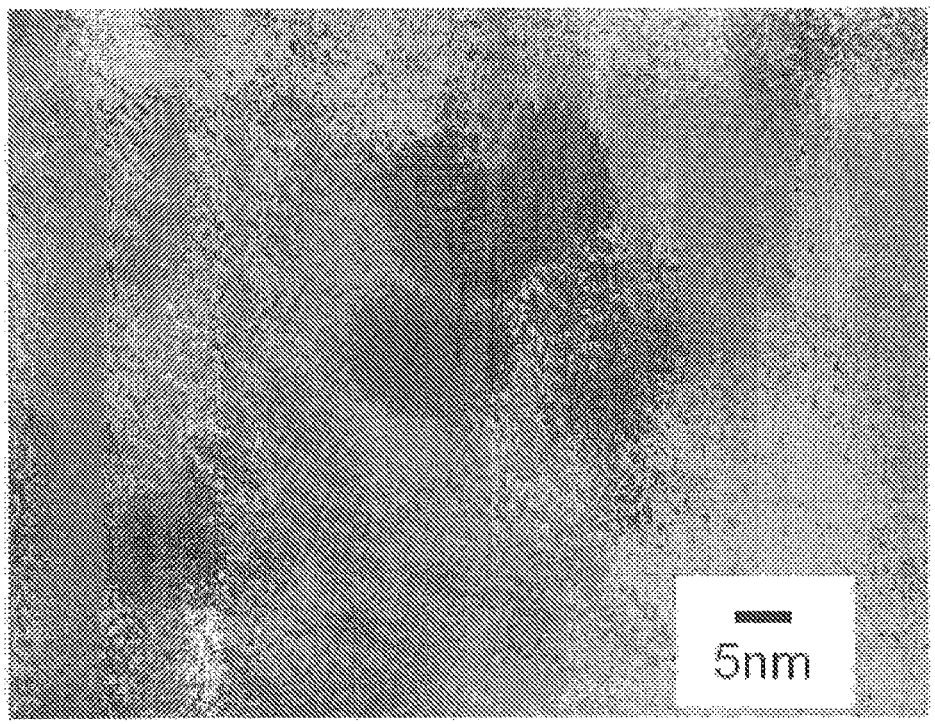
FIG. 2A is a TEM image of a sea-islands structure relevant to the present invention.
Figure 2B:
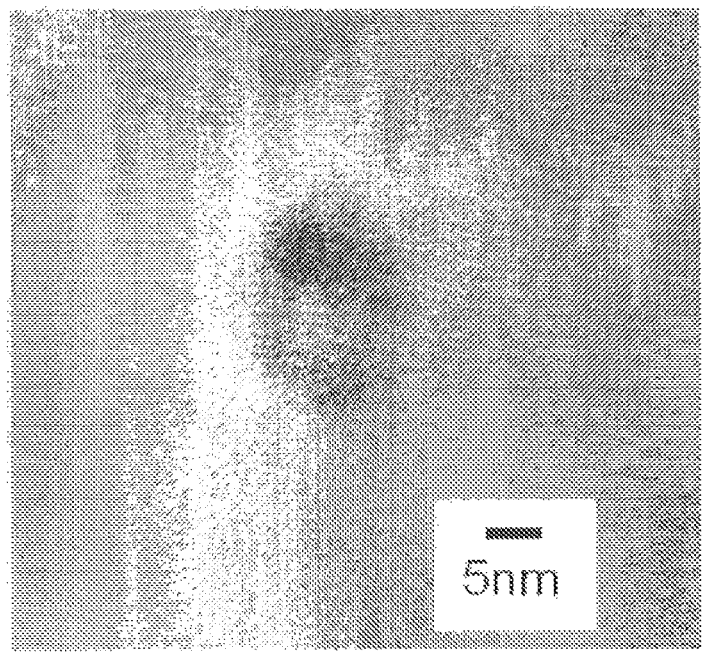
FIG. 2B is a TEM image of a sea-islands structure relevant to the present invention.

An exemplary image of cross sections of the composite grains relevant to the present invention, observed under a transmission electron microscope (H-9000 UHR III, from Hitachi, Ltd.), are shown in FIGS. 1, 2A and 2B. FIG. 1 shows the composite grain of iron lithium silicate, in which regions which look dark in the figure correspond to the iron lithium silicate crystal, whereas a region which looks relatively bright around the dark regions corresponds to the carbon material. FIG. 2A is an enlarged view of the image. FIG. 2B shows the composite grain of manganese lithium silicate observed in a similar manner. As seen in the figures, it is confirmed that the plurality of dark regions (lithium silicate crystals) are scattered in a discrete manner, and the bright region (carbon material) lies as a bulk between the dark regions.

The present inventors suppose that the composite grain contained in the cathode material of the present invention allows electrons, which generate concurrently with intercalation and deintercalation of lithium ion at the individual islands, to migrate through the carbon material as the matrix by virtue of its sea-islands structure, so that much of the lithium silicate crystal contained in the composite grain can fully be utilized as the active material and thereby a large actual capacity can be achieved.

Another observed tendency is that the smaller the individual islands, the larger the actual capacity. This is supposedly because the range of migration in solid of lithium ion in the island becomes shorter.

More specifically, the present inventors found out that a large actual capacity of 1.5 Li or above was obtained, when the islands of the lithium silicate crystal in the composite grain give an average value of diameter, calculated from circle respectively having the same area with the island (referred to as "circle-equivalent diameter", hereinafter), of smaller than 15 nm. When the value is 15 nm or larger, the distance of diffusion in solid will increase, so that lithium ion will not be able to diffuse within a practical duration of charge/discharge time and thereby a large actual capacity will not be obtainable.

The lower limit value of the circle-equivalent diameter is a minimum size by which the lithium silicate can keep regularity (periodicity) as being a crystal, and is generally 1 nm. Accordingly, the circle-equivalent diameter of the lithium silicate crystal of the present invention is preferably 1 nm or larger and smaller than 15 nm.

The circle-equivalent diameter of the lithium silicate crystal in the composite grain may be determined by processing an image observed under a transmission electron microscope. More specifically, the circle-equivalent diameter may be determined by converting an image of the transmission electron microscope into two-level data and by finding the diameter of a circle having the same area with each crystal. The converting into two-level data is conducted by presetting a threshold value of contrast by which a region with an observable lattice fringe (range occupied by the lithium silicate crystal) is discriminable from the region therearound. Alternatively, the region with the observable lattice fringe may be thresholded as a region occupied by the lithium silicate crystal. The number-average value of twenty or more samples are preferably employed to determine the average value of the circle-equivalent diameter. In Examples explained below, the circle-equivalent diameter was determined by the number-average value of 50 samples.

The composite grain preferably has a BET (Brunauer-Emmett-Teller) specific surface area of 25 to 110 m²/g. In this range, the electrolytic solution in an assembled battery will be easier to impregnate and thereby time interval that the battery is enabled to start charge/discharge after being manufactured may be shortened. If the BET specific surface area is smaller than 25 m²/g or exceeds 110 m²/g, the electrolytic solution will be more difficult to impregnate.

It is further preferable in the present invention that the carbon material contained in the composite grain, when measured by X-ray photoelectron spectroscopy (referred to as "XPS", hereinafter), shows a $C_{1S}$ peak which contains not only an $SP^2$ peak assignable to the graphite skeleton and an $SP^3$ peak assignable to the diamond skeleton but also a shoulder peak located on the higher energy side of them. The $SP^2$ peak and the $SP^3$ peak are attributable to carbon per se, and the shoulder peak is attributable to functional groups bound to the carbon skeleton, such as hydroxy group (—OH), carboxy group (—COOH), carbonyl group (=C=O) or the like. Each of these functional groups act as a hydrophilic group (also referred to as polar group).

For example, a dummy peak 1 in FIG. 3 is assigned to C in C—OH, and a dummy peak 2 is assigned to C in C=O or COOH. Accordingly, when the carbon material in the composite grain shows the above-described shoulder peak, the carbon material will show large wettability with the solvent of electrolyte (polar solvent), and will therefore allow the electrolytic solution to impregnate with ease throughout fine structural portions of the cathode.

When XPS is measured, gold is measured concurrently with a sample to be measured, and the bond energy (eV) is calibrated with reference to Au 4f7/2 peak adjusted at 84.0 eV. The peaks are separated after the background is eliminated from the XPS spectrum. Peak fitting is carried out using the $SP^2$ peak (284.3 eV) and the $SP^3$ peak (285.3 eV) with the above peak position (bond energy) fixed, together with two dummy peaks described above, while assuming that each of the four peaks follows the Gauss-Lorentz distribution. The $SP^2$ peak and the $SP^3$ peak are fitted while fixing the peak positions while leaving the peak width and the peak height variable. The two dummy peaks are fitted while leaving the peak position, the peak width and the peak height variable.

Now, let the peak area of $C_{1S}$ measured as described above be A, $SP^2$ peak area be $A_{SP2}$, and the $SP^3$ peak area be $A_{SP3}$. In the present invention, it is determined that the shoulder peak is present when a ratio $A_R/A$, which represents a ratio of remainder $A_R$ obtained by subtracting the $AP^2$ peak area $A_{SP2}$ and the $AP^3$ peak area $A_{SP3}$ from the $C_{1S}$ peak area A (=A−$A_{SP2}$−$A_{SP3}$) relative to the $C_{1S}$ peak area A, is 0.15 or larger.

In the present invention, $A_R/A$ preferably falls in the range from 0.25 to 0.40. If $A_R/A$ is smaller than 0.25, a longer time may be necessary for the electrolytic solution to impregnate. Meanwhile, if $A_R/A$ exceeds 0.40, a large capacity will not always be achieved. This is supposedly because the electric conductivity was decreased due to an increased ratio of content of hydrophilic groups in the carbon skeleton. In short, since the carbon material which contains the hydrophilic groups is poor in the electric conductivity, so that the active material may become less electrically conductive with the current collector and the electrically conductive auxiliary, and this supposedly makes it difficult to achieve a large capacity in some cases.

The carbon material relevant to the present invention contains an elemental carbon and the content of graphitic skeletal carbon contained in the carbon material in the composite grain is preferably 20 to 70%. If the content of the graphitic skeletal carbon is lower than 20%, the carbon material will be lowered in the electric conductivity, making it difficult to obtain a large capacity. On the other hand, if the content of graphitic skeletal carbon exceeds 70%, the electrolytic solution will become hard to impregnate due to increased hydrophobicity, again making it difficult to obtain a large capacity. The content of the graphitic skeletal carbon may be determined from the value of $A_{SP2}/A$ in the XPS peak described above. Accordingly, the value of $A_{SP2}/A$ is preferably 0.2 to 0.7.

The content of carbon material in the composite grain is preferably 2 to 25% by mass. If the content of carbon material is lower than 2% by mass, an electron conduction path towards the current collector may be ensured only to an insufficient degree, and therefore good battery characteristics will not always be obtained. If the content of carbon material exceeds 25% by mass, the ratio of content of active material in a manufactured electrode will decrease and therefore a high battery capacity will not always be obtained depending on the way of designing the battery. By adjusting the content of carbon material in the composite grain to 2 to 25% by mass, good battery performances may easily be ensured and thereby a range of selection of battery design may be widened.

The carbon material is more preferably porous since the electrolytic solution may impregnate into fine pores of such carbon material and this facilitates intercalation/deintercalation of lithium ion at the surface of oxide as the active material.

The average value of the circle-equivalent diameter of the composite grain observable under a scanning electron microscope or a transmission electron microscope is preferably 50 to 500 nm. If the average value is smaller than 50 nm or larger than 500 nm, good battery characteristics will not always be obtainable under high-rate operation. The circle-equivalent diameter of the composite grain may be determined similarly as described above by processing a microphotographic image.

In the present invention, the cathode material which contains the above-described composite grains is further added with at least a binder to thereby give the cathode layer with voids into which the electrolytic solution can impregnate. By forming such cathode layer on a surface of an electro-conductive metal foil, the cathode member may be obtained.

The binder (also referred to as an adhesive agent) serves to bond the active material and the electrically conductive auxiliary. The binder used in the present invention is selectable from those generally used for manufacturing the cathode of the lithium ion secondary battery without special limitation. The binder is preferably any of those chemically and electrochemically stable against the electrolyte of the lithium ion secondary battery and the solvent of the electrolyte. The binder may be either of thermoplastic resin and thermosetting resin. For example, the binder is exemplified by polyolefins including polyethylene and polypropylene; fluorine-containing resins including polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer; styrene butadiene rubber (SBR); ethylene-acrylic acid copolymer or $Na^+$ ion crosslinked product of the copolymer; ethylene-methacrylic acid copolymer or $Na^+$ ion crosslinked product of the copolymer; ethylene-methyl acrylate copolymer or $Na^+$ ion crosslinked product of the copolymer; ethylene-methyl methacrylate copolymer or $Na^+$ ion crosslinked product of the copolymer; and carboxymethyl cellulose. Two or more species of the materials exemplified above may be used in combination. Among these materials, PVDF and PTFE are particularly preferable. The amount of use of the binder is generally 1% by mass to 20% by mass or around of the total mass of cathode.

The cathode layer may further contain the electrically conductive auxiliary. The electrically conductive auxiliary is selectable without special limitation from electron conductive materials which are chemically stable. Examples of the electrically conductive auxiliary include carbon materials such as graphites including natural graphite (flaky graphite, etc.) and synthetic graphite; acetylene black; Ketjen black; carbon blacks including channel black, furnace black, lamp black and thermal black; carbon fiber; and also include electro-conductive fibers including metal fiber; carbon fluoride; metal powders of aluminum, etc.; zinc oxide; electro-conductive whiskers of potassium titanate, etc.; electro-conductive metal oxides including titanium oxide; and organic electro-conductive materials including polyphenylene derivatives. Only a single species of the electrically conductive auxiliary may be used independently, or two or more species of which may be used in combination. Among these materials, particularly preferable are carbon materials such as acetylene black, Ketjen black and carbon black. The amount of use of the electrically conductive auxiliary is generally 1 to 25% by mass of the total mass of cathode.

As the metal foil, typically usable is a foil made of aluminum or aluminum alloy, the thickness of which is typically 1 to 100 μm, and is preferably 5 to 50 μm.

The lithium ion secondary battery may be obtained, typically by combining the above-described cathode member with at least the anode, the separator, and the non-aqueous electrolytic solution.

The anode contains an anode active material and an optional binder. The anode active material usable herein is any material capable of allowing metallic lithium or lithium ion to dope and undope. More specifically, the anode active material usable herein includes carbon materials such as graphite, pyrolytic carbons, cokes, glassy carbons, sintered product of organic polymer compound, mesocarbon microbead, carbon fiber and activated carbon. Also metal of Si, Sn or In; or compounds such as oxide of Si, Sn or Ti capable of allowing charge and discharge at a low potential which is equivalent to that of lithium and nitride of Li and Co such as $Li_{2.6}Cu_{0.4}N$, may be used as the anode active material. A part of graphite may further be replaced with a metal alloyable with lithium, or with an oxide. When graphite is used as the anode active material, the voltage in the full-charge state may be assumed as approximately 0.1 V with reference to lithium, so that the potential of the cathode may be calculated for convenience by adding 0.1 V to the battery voltage. This is preferable from the viewpoint that the charge potential of the cathode is easy to control.

The anode may be configured to have the anode layer, which contains the anode active material and the binder, formed on the metal foil which serves as the current collector. The metal foil is exemplified by those composed of elemental copper, nickel, titanium or alloys of these elements or stainless steel. Materials for composing the metal foil preferably used in the present invention are exemplified by copper and alloys thereof. Preferable metals alloyable with cooper include zinc, nickel, tin, aluminum and so forth. A small amount of iron, phosphorus, lead, manganese, titanium, chromium, silicon, arsenic or the like may additionally be used.

The separator may be any types of film having large ion permeability, a certain level of mechanical strength, and insulating property. Materials for composing the separator are exemplified by olefinic polymer, fluorine-containing polymer, cellulosic polymer, polyimide, nylon, glass fiber, and alumina fiber. Available form of the separator is exemplified by non-woven fabric, woven fabric and micro-porous film. In particular, preferable examples of materials include polypropylene, polyethylene, mixture of polypropylene and polyethylene, mixture of polypropylene and polytetrafluoroethylene (PTFE), and mixture of polyethylene and polytetrafluoroethylene (PTFE). The available form of the separator is preferably a micro-porous film, and more preferably the micro-porous film with a pore size of 0.01 µm to 1 µm, and a thickness of 5 µm to 50 µm. The micro-porous film may be a single film, or may be a composite film composed of two or more layers having different properties such as pore geometry, density and quality of material. For example, a composite film configured by bonding a polyethylene film and a polypropylene film is exemplified.

The non-aqueous electrolytic solution is generally composed of an electrolyte (supporting salt) and a non-aqueous solvent. The supporting salt mainly used for the lithium secondary battery is lithium salt. The lithium salt usable in the present invention is exemplified by $LiClO_4$, $LiBF_4$, $LiPF_6$, $LiCF_3CO_2$, $LiAsF_6$, $LiSbF_6$, $LiB_{10}Cl_{10}$, fluorosulfonate salt represented by $LiOSO_2C_nF_{2n+1}$ (n represents a positive integer of 6 or smaller), imide salt represented by $LiN(SO_2C_nF_{2n+1})(SO_2C_mF_{2m+1})$ (each of m and n independently represents a positive integer of 6 or smaller), methide salt represented by $LiC(SO_2C_pF_{2p+1})(SO_2C_qF_{2q+1})(SO_2C_rF_{2r+1})$ (each of p, q and r independently represents a positive integer of 6 or smaller), lithium salt of lower aliphatic carboxylic acid, $LiAlCl_4$, LiCl, LiBr, LiI, chloroborane lithium and lithium tetraphenylborate. Only a single species of which may be used independently, or two or more species of which may be used in a mixed manner. Among them, $LiBF_4$ and/or $LiPF_6$ in the dissolved form are preferably used. Concentration of the supporting salt is preferably 0.2 mol to 3 mol per one liter of electrolytic solution, although not specifically limited.

The non-aqueous solvent is exemplified by aprotic organic solvents which include propylene carbonate, ethylene carbonate, butylene carbonate, chloroethylene carbonate, trifluoromethyl ethylene carbonate, difluoromethyl ethylene carbonate, monofluoromethyl ethylene carbonate, hexafluoromethyl acetate, trifluoromethyl acetate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, 2,2-bis(trifluoromethyl)-1,3-dioxolane, formamide, dimethyl formamide, dioxolane, dioxane, acetonitrile, nitromethane, ethyl monoglyme, phosphoric triester, boric triester, trimethoxymethane, dioxolane derivative, sulfolane, 3-methyl-2-oxazolidinone, 3-alkylsydnone (alkyl group is a propyl group, isopropyl group, butyl group, etc.), propylene carbonate derivative, tetrahydrofuran derivative, ethyl ether and 1,3-propane sultone; and ionic liquid, only a single species of which may be used independently, or two or more species of which may be used in a mixed manner. Among them, the carbonate-based solvents are preferable, wherein it is particularly preferable to use cyclic carbonate and acyclic carbonate in a mixed manner. The cyclic carbonate is preferably ethylene carbonate or propylene carbonate. The acyclic carbonate is preferably diethyl carbonate, dimethyl carbonate or methylethyl carbonate. The ionic liquid is preferable, taking high potential window and heat resistance into consideration.

The electrolytic solution preferably contains $LiCF_3SO_3$, $LiClO_4$, $LiBF_4$ and/or $LiPF_6$, dissolved in an electrolytic solution prepared by appropriately mixing ethylene carbonate, propylene carbonate, 1,2-dimethoxyethane, dimethyl carbonate or diethyl carbonate. A particularly preferable electrolytic solution contains at least one species of salt selected from $LiCF_3SO_3$, $LiClO_4$ and $LiBF_4$, together with $LiPF_6$, dissolved in a mixed solvent of at least either one of propylene carbonate and ethylene carbonate and at least either one of dimethyl carbonate and diethyl carbonate. The amount of addition of the electrolytic solution to the battery is arbitrarily selectable without special limitation, depending on the amounts of cathode material and the anode material, and the size of battery.

Besides the electrolytic solution, a solid electrolyte may be used in combination. The solid electrolyte is classified into inorganic solid electrolyte and organic solid electrolyte. The inorganic solid electrolyte is exemplified by nitride, halide and oxoate of lithium. Among them, preferable are $Li_3N$, LiI, $Li_5NI_2$, $Li_3N$—LiI—LiOH, $Li_4SiO_4$, $Li_4SiO_4$—LiI—LiOH, $xLi_3PO_4$-$(1-x)Li_4SiO_4$, $Li_2SiS_3$, and phosphorus sulfide compounds.

The organic solid electrolyte is exemplified by polyethylene oxide derivative or polymer containing such derivative, polypropylene oxide derivative or polymer containing such derivative, polymer containing ion dissociative group, mixture of polymer containing ion dissociative group and the above aprotic electrolytic solution, phosphoric ester polymer, and polymer matrix material impregnated with an aprotic polar solvent. Another possible method is to add polyacrylonitrile into an electrolytic solution. There is also known a method of using the inorganic solid electrolyte and organic solid electrolyte in combination.

Note that the above-described cathode member is not always essential for manufacturing the lithium ion secondary battery. For example, the lithium ion secondary battery may be manufactured by combining the cathode with the anode, the separator, and the non-aqueous electrolytic solution, where the cathode being configured by forming, on a metal mesh, the cathode layer which contains the cathode material, the electrically conductive auxiliary and the binder.

A method of manufacturing the cathode material of the present invention will be explained below.

The cathode material of the present invention may be manufactured by any of publicly known dry process or wet process, so long as the method can yield the composite grain having a sea-islands structure in which the lithium silicate crystals are scattered like islands in the carbon material, and the island having an average value of circle-equivalent diameter of smaller than 15 nm. The methods are exemplified by spray pyrolysis, flame process, spray roasting, solid phase process (solid phase reaction process), hydrothermal process (hydrothermal synthesis), coprecipitation process, sol-gel process, and vapor phase synthetic process (physical vapor deposition (PVD) process, chemical vapor deposition (CVD) process, for example). Any conventionally known methods, however, need to precisely control various conditions, when tried to obtain the composite grain of the present invention. It is difficult to actually manufacture the composite grain.

In the present invention, the composite grain is preferably manufactured by the method below. First, a solution which contains compound(s) which contain elements composing lithium silicate and an organic compound which produces the carbon material, is pyrolyzed while keeping the solution in the form of liquid droplets at or above the heat decomposition temperature of the compound. As a result of the reaction, intermediate grains of the target composite grains (referred to as intermediate grains, hereinafter) are obtained. By collecting the intermediate grains, and then heat-treating them in an inert atmosphere or in a reductive atmosphere at 400° C. or higher, and lower than the melting point of lithium silicate crystal, the composite grains may be obtained.

In the manufacturing method, the composite grains may be controlled in the structure thereof, by adjusting the temperature of heating of the liquid droplets, and by adjusting the temperature and length of time of succeeding heat treatment.

If the heat treatment temperature of the liquid droplets elevates, the circle-equivalent diameter of the lithium silicate crystal in the composite grain tends to increase. If the heat treatment temperature is too low, the crystal will not be obtained, meanwhile if the heat treatment temperature is too high, the crystal grows beyond a circle-equivalent diameter of 15 nm, occasionally making it impossible to obtain excellent charge/discharge characteristics. The heat treatment temperature is preferably 500 to 900° C.

The circle-equivalent diameter of the crystal may be controlled by combining the heat treatment temperature and heat treatment time. For example, when compared under the same heat treatment time, higher heat treatment temperature tends to increase the circle-equivalent diameter. Meanwhile when compared under the same heat treatment temperature, longer heat treatment time tends to increase the circle-equivalent diameter. Note, however, that the crystal is not always obtainable if the heat treatment temperature falls below 400° C. so that the heat treatment temperature is preferably set to 400° C. or above and lower than the melting point of lithium silicate. More preferably, the heat treatment temperature is lower than a temperature at which grain growth (surface migration) occurs, and is typically not higher than a temperature that is 0.757 times of the melting point (in Kelvin temperature, K) of lithium silicate. Too short heat treatment time may result in insufficient characteristics, whereas too long heat treatment time may be not practical from the viewpoints of economy and productivity. Accordingly, the heat treatment time is preferably 2 to 48 hours.

An exemplary method of manufacturing making use of spray pyrolysis will be explained.

A solution which contains compound(s) which contain elements composing lithium silicate and an organic compound which produces the carbon material is converted into liquid droplets using an ultrasonic wave or a nozzle (two fluid nozzle, four fluid nozzle, etc.). The liquid droplets are then introduced into a heating furnace, heated and reacted at the pyrolizing temperature or above to produce the intermediate grains, and the intermediate grains are heat treated in an inert atmosphere or in a reductive atmosphere at 400° C. or higher and lower than the melting point of lithium silicate.

If the circle-equivalent diameter of the intermediate grain is larger than 500 nm, the intermediate grain is preferably ground (crushed) prior to the heat treatment. The present invention is, however, not to exclude a possibility of crushing the composite grain obtained after the heat treatment to thereby adjust the circle-equivalent diameter. The crushing may be based on either wet process or dry process and may be conducted by any of publicly known methods using a jet mill, ball mill, vibrating mill, attritor, bead mill or the like. The circle-equivalent diameter of the composite grain is adjustable by grinding time, the size of grinding medium (grinding ball) and so forth.

In a specific case of iron lithium silicate, for example, a solution which contains lithium nitrate, iron (III) nitrate nonahydrate, and tetraethoxysilane (referred to as TEOS, hereinafter) is added with glucose and converted into liquid droplets using an ultrasonic atomizer or the like. The liquid droplets are introduced together with nitrogen gas as a carrier gas into the heating furnace and heated to 500 to 900° C. or around to thereby produce the intermediate grains. The intermediate grains are crushed, if necessary, and then heat treated in an inert atmosphere at 400° C. or above and below the melting point of iron lithium silicate.

For another case of manganese lithium silicate is used, for example, a solution which contains lithium nitrate, manganese (II) nitrate hexahydrate and colloidal silica is further added with glucose and converted into liquid droplets using an ultrasonic atomizer or the like. The liquid droplets are introduced into the heating furnace together with nitrogen gas as a carrier gas and heated to 500 to 900° C. or around to thereby produce the intermediate grains. Thereafter, the intermediate grains are crushed, if necessary, and then heat treated in an inert atmosphere at 400° C. or above and below the melting point of manganese lithium silicate.

Exemplary manufacturing methods making use of roasting process will be explained.

A solution, which contains compound(s) which contain elements composing lithium silicate and an organic compound which produces the carbon material, is converted into liquid droplets. The liquid droplets are introduced into a roasting furnace of the Ruthner type, Lurgi type, Chemirite type or the like and then heated and reacted at the pyrolizing temperature or above to produce the intermediate grains. The intermediate grains are then heat treated in an inert atmosphere or in a reductive atmosphere at 400° C. or above and below the melting point of lithium silicate. For the case where the target lithium silicate is a metal oxide which contains iron element, a source material to be used is preferably pickling waste liquid after steel cleaning or iron-dissolved acid solution.

The intermediate grains may be crushed, if necessary, before or after the heat treatment.

For a specific case of manganese lithium silicate, for example, a solution which contains lithium acetate, manganese (II) nitrate hexahydrate and colloidal silica is further added with glucose, introduced into a Chemirite type roasting furnace after being converted into liquid droplets, and heated to 500 to 900° C. or around to thereby produce the intermediate grains. The intermediate grains are crushed, if necessary, and then heat treated in an inert atmosphere at 400° C. or above and below the melting point of manganese lithium silicate.

For another case of iron lithium silicate, for example, a pickling waste liquid after steel cleaning (a 0.6 to 3.5 mol (Fe)/L waste hydrochloric acid liquid, for example) which contains lithium carbonate and colloidal silica is further added with glucose, introduced into a Ruthner type roasting furnace after being converted into liquid droplets, and heated to 500 to 900° C. or around to thereby produce the intermediate grains. The intermediate grains are crushed, if necessary, and then heat treated in an inert atmosphere at 400° C. or above and below the melting point of iron lithium silicate. When lithium carbonate is dissolved into the pickling waste liquid, it is preferable to preliminarily add an 18% by mass hydrochloric acid solution to the pickling waste liquid, for easy dissolution.

The organic compound (source material) which produces the carbon material in the present invention in the above-described manufacturing method is exemplified by ascorbic acid, monosaccharides (glucose, fructose, galactose, etc.), disaccharides (sucrose, maltose, lactose, etc.), polysaccharides (amylose, cellulose, dextrin, etc.), polyvinyl alcohol, polyethylene glycol, polypropylene glycol, polyvinyl butyral, polyvinyl pyrrolidone, phenol, hydroquinone, catechol, maleic acid, citric acid, malonic acid, ethylene glycol, triethylene glycol, diethylene glycol butyl methyl ether, triethylene glycol butyl methyl ether, tetraethylene glycol dimethyl ether, tripropylene glycol dimethyl ether and glycerin.

The compound which contains an element composing the metal oxide is exemplified by an elemental metal, hydroxide, nitrate, chloride, organic acid salt, oxide, carbonate and metal alkoxide.

EXAMPLE

Example 1

Preparation of Samples

Materials used for composing iron lithium silicate were lithium nitrate ($LiNO_3$), iron (III) nitrate nonahydrate (Fe $(NO_3)_3 \cdot 9H_2O$) and TEOS. Into a 0.3 mol/L aqueous solution which contains the source materials according to a compositional ratio of $Li_2FeSiO_4$, 0 to 160 g/L of glucose was added as an organic compound which produces the carbon material to thereby respectively prepare aqueous solutions corresponded to sample 1-1 to sample 1-19 listed in Table 1. TEOS in this process was added after preliminarily dissolving it into the same amount of 2-methoxyethanol.

Each of these aqueous solutions was subjected to spray pyrolysis in a heating furnace heated at 800° C., using a carrier gas composed of nitrogen gas, to thereby obtain the intermediate grains. The thus-obtained intermediate grains were wet ground using ethanol and each of the samples, excluding the sample 1-17, was then heat treated according to the conditions listed in Table 1 to thereby obtain the composite grains corresponded to sample 1-1 to sample 1-19. Sample 1-17 was subjected only to grinding but not to heat treatment. Sample 1-9 was heat treated under reduced pressure attained by a vacuum pump and all other samples were heat treated in a $N_2$ atmosphere containing 1 vol % of $H_2$ (denoted as 1%-$H_2$/$N_2$ atmosphere, hereinafter).

Sample 1-15 is an example characterized by addition of 0 g/L of glucose to the aqueous solution. Sample 1-16 is a carbon-coated version of sample 1-15, obtained by allowing a glucose solution to impregnate into sample 1-15, and then heat treatment of the product in the 1%-$H_2$/$N_2$ atmosphere at 600° C. for 2 hours.

(Analysis of Individual Samples)

The individual sample 1-1 to sample 1-19 thus obtained were analyzed as follows.

Sample 1-1 to sample 1-19 were subjected to X-ray diffractometry using a powder X-ray diffractometer (Ultima II, from Rigaku Corporation). $Li_2FeSiO_4$ crystal phase was confirmed in sample 1-1 to sample 1-16, but not confirmed in sample 1-17 to sample 1-19.

Cross sections of sample 1-1 to sample 1-19 were observed under a transmission electron microscope (H-9000 UHR III, from Hitachi Ltd.). Sample 1-1 to sample 1-14 were found to contain the composite grains having the sea-islands structure same as shown in FIG. 1, whereas sample 1-15 was not found to be conjugated with carbon. Sample 1-16 was found to contain the composite grain with a carbon coating, but not found to have the sea-islands structure. The islands were not confirmed in the composite grains corresponded to sample 1-17 to sample 1-19.

The circle-equivalent diameters of the islands (iron lithium silicate crystal) of sample 1-1 to sample 1-14 were estimated according to the method described above. Also the thus-obtained values of circle-equivalent diameters of the individual samples were given in Table 1.

The composite grains were observed under a scanning electron microscope (JSM-7000F, from JEOL Ltd.) and the circle-equivalent diameters of the composite grains were determined from the images. The determination was not made on sample 1-15 and sample 1-16.

The BET specific surface area of the individual samples was determined using an automatic specific surface area/pore distribution analyzer "TriStar 3000" from Shimadzu Corporation. Results were shown in Table 1.

Content of the carbon material in the individual samples was determined using carbon/sulfur analyzer EMIA-320V from Horiba Ltd. Results were shown in Table 1.

Presence (yes) or absence (no) of the $C_{1S}$ shoulder peak in the individual samples was determined using an X-ray photoelectron spectrometer "ESCA-3400" from Shimadzu Corporation. The shoulder peak was determined to be "present (yes)" when the $A_R/A$, calculated as described above, was 0.15 or larger.

As is clear from Table 1, correlation was found between the combinations of heat treatment temperature and heat treatment time and the structure (circle-equivalent diameter of the island) of the composite grains.

(Evaluation of Battery Characteristics)

Battery characteristics were evaluated as follows.

First, each sample was mixed with acetylene black powder and polytetrafluoroethylene powder according to a ratio by weight of 70:25:5 in a mortar and the mixture was compressed onto a titanium mesh to thereby manufacture the cathode.

A metallic lithium foil was used as the anode and a nickel foil of 20 μm thick was used as the current collector of the anode.

CR2032 type coin batteries were assembled in a glove box under an argon atmosphere by using a non-aqueous electrolytic solution as the electrolytic solution composed of ethyl carbonate and dimethyl carbonate in a ratio of 1:2 by volume, with 1.0 mol/L of $LiPF_6$ dissolved therein, and a porous polypropylene of 25 μm thick as the separator.

Five coin batteries were manufactured using every sample, and subjected to charge/discharge test in a thermostat chamber at 25° C. to thereby measure the initial charge/discharge capacity. In the initial charge/discharge test, first, preliminary charge/discharge was repeated twice according to the CC scheme over a voltage range of 1.5 to 5.0 V at a rate of 1.0 C, followed by charging according to the CC-CV scheme at a rate of 0.1 C up to 2Li, and the discharge capacity was measured to obtain initial charge/discharge capacity. In the column of "initial charge/discharge capacity" in Table 1, average value of the initial charge/discharge capacity obtained from three coin batteries out of five coin batteries of every sample was indicated, after omitting those showing the maximum value and the minimum value.

"Rapid charge/discharge capacity" column contains results of measurement of discharge capacity of other coin batteries. That is, similar preliminary charge/discharge was performed for the other coin batteries and they were charged at a rate of 3.0 C, and then the discharge capacity was measured.

Furthermore, electrolyte impregnation time was measured as follows. A coin battery of each sample was kept in a thermostat chamber at 25° C. for 24 hours so as to be impregnated with the electrolyte and then subjected to the charge/discharge test to thereby measure the initial charge/discharge capacity. The thus obtained value was assumed as a reference value. Thereafter, the initial charge/discharge capacity was measured for every sample in the same way, except that the holding time in the thermostat chamber was varied, to determine the minimum holding time at which the initial charge/discharge capacity equal to the reference value was obtained. The minimum holding time was given in the "electrolyte impregnation time" column.

25 to 110 m$^2$/g or having the shoulder peak in the $C_{1S}$ peak showed short electrolyte impregnation time. Those having the circle-equivalent diameter of the composite grain of 50 to 500 nm were also found to be large in the rapid charge/discharge capacity. It was additionally found that those having the carbon content of the composite grain in the range from 2 to 25% by mass showed still larger initial charge/discharge capacity.

TABLE 1

| SAMPLE | CONDITIONS OF HEAT-TREATMENT AFTER CRUSHING | | CRYSTAL PHASE | CIRCLE-EQUIVALENT DIAMETER OF ISLAND [nm] | CIRCLE-EQUIVALENT DIAMETER OF COMPOSITE GRAIN [nm] | BET SPECIFIC SURFACE AREA [m$^2$/g] |
|---|---|---|---|---|---|---|
| | TEMPERATURE [° C.] | TIME [h] | | | | |
| * 1-1 | 900 | 5 | Li$_2$FeSiO$_4$ | 20 | 400 | 22 |
| * 1-2 | 650 | 5 | Li$_2$FeSiO$_4$ | 15 | 350 | 25 |
| 1-3 | 500 | 20 | Li$_2$FeSiO$_4$ | 13 | 100 | 80 |
| 1-4 | 500 | 8 | Li$_2$FeSiO$_4$ | 10 | 80 | 110 |
| 1-5 | 500 | 8 | Li$_2$FeSiO$_4$ | 10 | 50 | 120 |
| 1-6 | 500 | 24 | Li$_2$FeSiO$_4$ | 14 | 90 | 25 |
| 1-7 | 500 | 7 | Li$_2$FeSiO$_4$ | 9 | 90 | 20 |
| 1-8 | 600 | 3 | Li$_2$FeSiO$_4$ | 12 | 90 | 60 |
| 1-9 | 550 | 50 | Li$_2$FeSiO$_4$ | 14 | 90 | 60 |
| 1-10 | 500 | 8 | Li$_2$FeSiO$_4$ | 10 | 90 | 60 |
| 1-11 | 550 | 10 | Li$_2$FeSiO$_4$ | 13 | 500 | 60 |
| 1-12 | 550 | 10 | Li$_2$FeSiO$_4$ | 13 | 450 | 60 |
| 1-13 | 500 | 8 | Li$_2$FeSiO$_4$ | 10 | 40 | 60 |
| 1-14 | 500 | 8 | Li$_2$FeSiO$_4$ | 10 | 100 | 5 |
| * 1-15 | 500 | 8 | Li$_2$FeSiO$_4$ | 12 | — | 1 |
| * 1-16 | 500 | 8 | Li$_2$FeSiO$_4$ | 15 | — | 5 |
| * 1-17 | — | — | — | — | 90 | 60 |
| * 1-18 | 500 | 1 | — | — | 90 | 60 |
| * 1-19 | 400 | 3 | — | — | 90 | 60 |

| SAMPLE | CONTENT OF CARBON MATERIAL [% by mass] | PRESENCE OR ABSENCE OF SHOULDER PEAK | INITIAL CHARGE/ DISCHARGE CAPACITY [mAh/g, 0.1 C] | RAPID CHARGE/ DISCHARGE CAPACITY [mAh/g, 3.0 C] | ELECTROLYTE IMPREGNATION TIME [h] |
|---|---|---|---|---|---|
| * 1-1 | 2 | YES | 200 | 60 | 4 |
| * 1-2 | 3 | YES | 220 | 66 | 4 |
| 1-3 | 15 | YES | 270 | 86 | 3 |
| 1-4 | 20 | YES | 270 | 86 | 3 |
| 1-5 | 28 | YES | 260 | 83 | 9 |
| 1-6 | 10 | YES | 270 | 86 | 2 |
| 1-7 | 8 | YES | 260 | 83 | 9 |
| 1-8 | 12 | YES | 270 | 86 | 2 |
| 1-9 | 12 | NO | 260 | 83 | 10 |
| 1-10 | 12 | YES | 265 | 85 | 2 |
| 1-11 | 12 | YES | 260 | 78 | 6 |
| 1-12 | 12 | YES | 265 | 85 | 5 |
| 1-13 | 12 | YES | 260 | 78 | 5 |
| 1-14 | 1 | YES | 250 | 80 | 9 |
| * 1-15 | 0 | — | 150 | 45 | 8 |
| * 1-16 | 12 | NO | 150 | 45 | 8 |
| * 1-17 | 12 | YES | 215 | 65 | 5 |
| * 1-18 | 12 | YES | 220 | 66 | 5 |
| * 1-19 | 12 | YES | 215 | 65 | 5 |

* OUT OF RANGE OF THE PRESENT INVENTION

As shown above, sample 1-1 and sample 1-2 were found to contain the composite grains having the sea-islands structure but with a circle-equivalent diameter of island of 15 nm or larger. It has been proved that they failed in obtaining large initial charge/discharge capacity. Large initial charge/discharge capacity was not obtainable again from sample 1-15 to sample 1-19 which were found to contain the composite grains but without the sea-islands structure.

In contrast, sample 1-3 to sample 1-14 were found to achieve large initial charge/discharge capacity. In particular, those having the BET specific surface area in the range from Example 2

Materials used for composing manganese lithium silicate were lithium nitrate (LiNO$_3$), manganese (II) nitrate tetrahydrate (Mn(NO$_3$)$_2$.4H$_2$O) and colloidal silica (SO$_2$). Into a 0.4 mol/L aqueous solution which contains the source materials according to a compositional ratio of Li$_2$MnSiO$_4$, 0 to 200 g/L of glucose was added as an organic compound which produces the carbon material, to thereby respectively prepare aqueous solutions corresponded to sample 2-1 to sample 2-19 listed in Table 2.

Each of these aqueous solutions was subjected to spray pyrolysis in a heating furnace heated at 800° C., using a carrier gas composed of nitrogen gas, to thereby obtain the intermediate grains. Each of the thus-obtained intermediate grains was wet ground using ethanol and each of them, excluding sample 2-17, was then heat treated according to the conditions listed in Table 2 to thereby obtain the composite grains corresponded to sample 2-1 to sample 2-19. Sample 2-17 was subjected only to grinding but not to heat treatment. Sample 2-9 was heat treated under reduced pressure attained by a vacuum pump and all other samples were heat treated in the 1%-$H_2$/$N_2$ atmosphere.

Sample 2-15 is an example characterized by addition of 0 g/L of glucose to the aqueous solution. Sample 2-16 is a carbon-coated version of sample 2-15, obtained by allowing a glucose solution to impregnate into sample 2-15 and then heat treatment of the product in the 1%-$H_2$/$N_2$ atmosphere at 600° C. for 2 hours.

Results of analysis and evaluation conducted in the same way as in Example 1 were listed in Table 2. Sample 2-1 to sample 2-14 and sample 2-19 were found to contain the composite grains having the sea-islands structure same as shown in FIG. 1, whereas sample 2-15 was not found to be conjugated with carbon. Sample 2-16 was found to contain the composite grain with a carbon coating, but without the sea-islands structure. The islands were not confirmed in the composite grains corresponded to sample 2-17 and sample 2-18.

As shown above, sample 2-1 and sample 2-2 were found to contain the composite grains having the sea-islands structure but with a circle-equivalent diameter of island of 15 nm or larger. It has been proved that they failed in obtaining large initial charge/discharge capacity. Large initial charge/discharge capacity was not obtainable again from sample 2-15 to sample 2-18 which were found to contain the composite grains but without the sea-islands structure.

in contrast, sample 2-3 to sample 2-14 and sample 2-19 were found to achieve large initial charge/discharge capacity. In particular, those having the BET specific surface area in the range from 25 to 110 $m^2$/g or having the shoulder peak in the $C_{1S}$ peak showed short electrolyte impregnation time. Those having the circle-equivalent diameter of the composite grain of 50 to 500 nm were found to be also large in the rapid charge/discharge capacity. It was additionally found that those having the carbon content of the composite grain in the range from 2 to 25% by mass showed still larger initial charge/discharge capacity.

TABLE 2

| SAMPLE | CONDITIONS OF HEAT-TREATMENT AFTER CRUSHING | | CRYSTAL PHASE | CIRCLE-EQUIVALENT DIAMETER OF ISLAND [nm] | CIRCLE-EQUIVALENT DIAMETER OF COMPOSITE GRAIN [nm] | BET SPECIFIC SURFACE AREA [$m^2$/g] |
| --- | --- | --- | --- | --- | --- | --- |
| | TEMPERATURE [° C.] | TIME [h] | | | | |
| * 2-1 | 900 | 4 | $Li_2MnSiO_4$ | 25 | 400 | 25 |
| * 2-2 | 850 | 4 | $Li_2MnSiO_4$ | 15 | 350 | 26 |
| 2-3 | 600 | 5 | $Li_2MnSiO_4$ | 14 | 110 | 80 |
| 2-4 | 700 | 6 | $Li_2MnSiO_4$ | 13 | 85 | 100 |
| 2-5 | 700 | 3 | $Li_2MnSiO_4$ | 13 | 50 | 120 |
| 2-6 | 600 | 5 | $Li_2MnSiO_4$ | 13 | 80 | 25 |
| 2-7 | 500 | 12 | $Li_2MnSiO_4$ | 13 | 80 | 20 |
| 2-8 | 500 | 8 | $Li_2MnSiO_4$ | 8 | 80 | 75 |
| 2-9 | 700 | 50 | $Li_2MnSiO_4$ | 12 | 80 | 75 |
| 2-10 | 600 | 10 | $Li_2MnSiO_4$ | 10 | 80 | 75 |
| 2-11 | 500 | 4 | $Li_2MnSiO_4$ | 13 | 520 | 75 |
| 2-12 | 700 | 3 | $Li_2MnSiO_4$ | 13 | 460 | 75 |
| 2-13 | 80 | 5 | $Li_2MnSiO_4$ | 14 | 45 | 75 |
| 2-14 | 600 | 5 | $Li_2MnSiO_4$ | 13 | 90 | 5 |
| * 2-15 | 600 | 5 | $Li_2MnSiO_4$ | 13 | — | 1 |
| * 2-16 | 700 | 4 | $Li_2MnSiO_4$ | 15 | — | 3 |
| * 2-17 | — | — | — | — | 80 | 75 |
| * 2-18 | 500 | 1 | — | — | 90 | 60 |
| 2-19 | 400 | 60 | $Li_2MnSiO_4$ | 3 | 90 | 60 |

| SAMPLE | CONTENT OF CARBON MATERIAL [% by mass] | PRESENCE OR ABSENCE OF SHOULDER PEAK | INITIAL CHARGE/ DISCHARGE CAPACITY [mAh/g, 0.1 C] | RAPID CHARGE/ DISCHARGE CAPACITY [mAh/g, 3.0 C] | ELECTROLYTE IMPREGNATION TIME [h] |
| --- | --- | --- | --- | --- | --- |
| * 2-1 | 2 | YES | 210 | 63 | 4 |
| * 2-2 | 4 | YES | 235 | 71 | 4 |
| 2-3 | 11 | YES | 265 | 85 | 3 |
| 2-4 | 14 | YES | 265 | 85 | 3 |
| 2-5 | 27 | YES | 250 | 80 | 8 |
| 2-6 | 7 | YES | 270 | 86 | 3 |
| 2-7 | 5 | YES | 250 | 80 | 8 |
| 2-8 | 8 | YES | 270 | 86 | 2 |
| 2-9 | 8 | NO | 265 | 85 | 10 |
| 2-10 | 9 | YES | 270 | 86 | 2 |
| 2-11 | 8 | YES | 260 | 76 | 6 |
| 2-12 | 9 | YES | 265 | 85 | 5 |
| 2-13 | 9 | YES | 260 | 78 | 5 |
| 2-14 | 1 | YES | 250 | 80 | 8 |
| * 2-15 | 0 | — | 170 | 51 | 8 |
| * 2-16 | 10 | NO | 175 | 53 | 8 |

TABLE 2-continued

| | | | | | |
|---|---|---|---|---|---|
| * 2-17 | 8 | YES | 200 | 60 | 4 |
| * 2-18 | 12 | YES | 220 | 66 | 5 |
| 2-19 | 12 | YES | 250 | 75 | 5 |

* OUT OF RANGE OF THE PRESENT INVENTION

Example 3

Materials used for composing iron lithium silicate partially substituted by manganese were lithium carbonate ($Li_2CO_3$), iron (II) chloride ($FeCl_2$), manganese (II) carbonate ($MnCO_3$), and colloidal silica ($SiO_2$). Into a 0.4 mol/L aqueous solution which contains the source materials according to a compositional ratio of $Li_2(Fe_{0.85}Mn_{0.15})SiO_4$, 0 to 150 g/L of glucose was added as an organic compound which produces the carbon material, to thereby respectively prepare aqueous solutions corresponded to sample 3-1 to sample 3-19 listed in Table 3.

Each of these aqueous solutions was subjected to spray pyrolysis in a heating furnace heated at 800° C., using a carrier gas composed of nitrogen gas, to thereby obtain the intermediate grains. Each of the thus-obtained intermediate grains was wet ground using ethanol and each of them, excluding sample 3-17, was then heat treated according to the conditions listed in Table 3 to thereby obtain the composite grains corresponded to sample 3-1 to sample 3-19. Sample 3-17 was subjected only to grinding but not to heat treatment. Sample 3-9 was heat treated under reduced pressure attained by a vacuum pump and all other samples were heat treated in the 1%-$H_2/N_2$ atmosphere.

Sample 3-15 is an example characterized by addition of 0 g/L of glucose to the aqueous solution. Sample 3-16 is a carbon-coated version of sample 3-15, obtained by allowing a glucose solution to impregnate into sample 3-15 and then heat treatment of the product in the 1%-$H_2/N_2$ atmosphere at 600° C. for 2 hours.

Results of analysis and evaluation conducted in the same way as in Example 1 were listed in Table 3. Sample 3-1 to sample 3-14 were found to contain the composite grains having the sea-islands structure same as shown in FIG. 1, whereas sample 3-15 was not found to be conjugated with carbon. Sample 3-16 was found to contain the composite grain with a carbon coating but without the sea-islands structure. The islands were not confirmed in the composite grains corresponded to sample 3-17 to sample 3-19.

As shown above, sample 3-1 and sample 3-2 were found to contain the composite grains having the sea-islands structure but with a circle-equivalent diameter of island of 15 nm or larger. It has been proved that they failed in obtaining large initial charge/discharge capacity. Large initial charge/discharge capacity was not obtainable again from sample 3-15 to sample 3-19 which were found to contain the composite grains but without the sea-islands structure.

In contrast, sample 3-3 to sample 3-14 were found to achieve large initial charge/discharge capacity. In particular, those having the BET specific surface area in the range from 25 to 110 m²/g or having the shoulder peak in the $C_{1S}$ peak showed short electrolyte impregnation time. Those having the circle-equivalent diameter of the composite grain of 50 to 500 nm were found to be also large in the rapid charge/discharge capacity. It was additionally found that those having the carbon content of the composite grain in the range from 2 to 25% by mass showed still larger initial charge/discharge capacity.

TABLE 3

| SAMPLE | CONDITIONS OF HEAT-TREATMENT AFTER CRUSHING TEMPERATURE [° C.] | TIME [h] | CRYSTAL PHASE | CIRCLE-EQUIVALENT DIAMETER OF ISLAND [nm] | CIRCLE-EQUIVALENT DIAMETER OF COMPOSITE GRAIN [nm] | BET SPECIFIC SURFACE AREA [m²/g] |
|---|---|---|---|---|---|---|
| * 3-1 | 950 | 5 | $Li_2(Fe_{0.85}Mn_{0.15})SiO_4$ | 30 | 350 | 25 |
| * 3-2 | 850 | 5 | $Li_2(Fe_{0.85}Mn_{0.15})SiO_4$ | 15 | 300 | 25 |
| 3-3 | 550 | 24 | $Li_2(Fe_{0.85}Mn_{0.15})SiO_4$ | 11 | 100 | 80 |
| 3-4 | 550 | 7 | $Li_2(Fe_{0.85}Mn_{0.15})SiO_4$ | 13 | 80 | 100 |
| 3-5 | 550 | 7 | $Li_2(Fe_{0.85}Mn_{0.15})SiO_4$ | 13 | 50 | 120 |
| 3-6 | 500 | 30 | $Li_2(Fe_{0.85}Mn_{0.15})SiO_4$ | 9 | 90 | 25 |
| 3-7 | 550 | 7 | $Li_2(Fe_{0.85}Mn_{0.15})SiO_4$ | 14 | 90 | 20 |
| 3-8 | 800 | 2 | $Li_2(Fe_{0.85}Mn_{0.15})SiO_4$ | 8 | 90 | 65 |
| 3-9 | 550 | 50 | $Li_2(Fe_{0.85}Mn_{0.15})SiO_4$ | 12 | 90 | 65 |
| 3-10 | 550 | 7 | $Li_2(Fe_{0.85}Mn_{0.15})SiO_4$ | 12 | 90 | 65 |
| 3-11 | 600 | 9 | $Li_2(Fe_{0.85}Mn_{0.15})SiO_4$ | 12 | 500 | 65 |
| 3-12 | 550 | 9 | $Li_2(Fe_{0.85}Mn_{0.15})SiO_4$ | 12 | 450 | 65 |
| 3-13 | 550 | 7 | $Li_2(Fe_{0.85}Mn_{0.15})SiO_4$ | 12 | 40 | 65 |
| 3-14 | 550 | 6 | $Li_2(Fe_{0.85}Mn_{0.15})SiO_4$ | 13 | 100 | 5 |
| * 3-15 | 550 | 6 | $Li_2(Fe_{0.85}Mn_{0.15})SiO_4$ | 13 | — | 1 |
| * 3-16 | 550 | 9 | $Li_2(Fe_{0.85}Mn_{0.15})SiO_4$ | 15 | — | 3 |
| * 3-17 | — | — | — | — | 100 | 85 |
| * 3-18 | 500 | 1 | — | — | 100 | 60 |
| * 3-19 | 400 | 3 | — | — | 100 | 60 |

| SAMPLE | CONTENT OF CARBON MATERIAL [% by mass] | PRESENCE OR ABSENCE OF SHOULDER PEAK | INITIAL CHARGE/ DISCHARGE CAPACITY [mAh/g, 0.1 C] | RAPID CHARGE/ DISCHARGE CAPACITY [mAh/g, 3.0 C] | ELECTROLYTE IMPREGNATION TIME [h] |
|---|---|---|---|---|---|
| * 3-1 | 2 | YES | 200 | 58 | 4 |
| * 3-2 | 3 | YES | 210 | 61 | 4 |
| 3-3 | 13 | YES | 265 | 87 | 2 |

TABLE 3-continued

|   | Sample | | | | |
|---|---|---|---|---|---|
| | 3-4 | 15 | YES | 265 | 87 | 2 |
| | 3-5 | 28 | YES | 255 | 84 | 8 |
| | 3-6 | 8 | YES | 275 | 91 | 1 |
| | 3-7 | 6 | YES | 265 | 87 | 8 |
| | 3-8 | 10 | YES | 270 | 89 | 2 |
| | 3-9 | 10 | NO | 265 | 87 | 11 |
| | 3-10 | 10 | YES | 270 | 89 | 3 |
| | 3-11 | 10 | YES | 260 | 75 | 6 |
| | 3-12 | 10 | YES | 265 | 87 | 5 |
| | 3-13 | 10 | YES | 260 | 75 | 5 |
| | 3-14 | 1 | YES | 255 | 84 | 10 |
| * | 3-15 | 0 | — | 165 | 48 | 10 |
| * | 3-16 | 10 | NO | 170 | 49 | 9 |
| * | 3-17 | 8 | YES | 200 | 58 | 6 |
| * | 3-18 | 10 | YES | 215 | 62 | 5 |
| * | 3-19 | 10 | YES | 210 | 61 | 5 |

* OUT OF RANGE OF THE PRESENT INVENTION

Example 4

An aqueous solution same as that used for sample 1-1 was prepared and sample 4-1 to sample 4-5 were obtained at the heating temperatures and heat treatment conditions listed in Table 4.

An aqueous solution same as that used for sample 2-1 was prepared and sample 4-6 to sample 4-10 were obtained at the heating temperatures and heat treatment conditions listed in Table 4.

Moreover, an aqueous solution same as that used for sample 3-1 was prepared and sample 4-11 to sample 4-15 were obtained at the heating temperatures and heat treatment conditions listed in Table 4.

Results of analysis and evaluation of sample 4-1 to sample 4-15 conducted in the same way as in Example 1 were listed in Table 4.

It is understood from Table 4 that the circle-equivalent diameter of the lithium silicate crystal in the composite grain is also in correlation to the pyrolytic temperature.

TABLE 4

| | SAMPLE | HEATING TEMPERATURE OF LIQUID DROPLETS [° C.] | CONDITIONS OF HEAT-TREATMENT AFTER CRUSHING | | | CIRCLE-EQUIVALENT DIAMETER OF ISLAND [nm] | CIRCLE-EQUIVALENT DIAMETER OF COMPOSITE GRAIN [nm] |
|---|---|---|---|---|---|---|---|
| | | | TEMPERATURE [° C.] | TIME [h] | CRYSTAL PHASE | | |
| * | 4-1 | 1000 | 500 | 10 | $Li_2FeSiO_4$ | 50 | 110 |
| | 4-2 | 900 | 500 | 10 | $Li_2FeSiO_4$ | 14 | 110 |
| | 4-3 | 600 | 500 | 10 | $Li_2FeSiO_4$ | 12 | 110 |
| | 4-4 | 500 | 500 | 10 | $Li_2FeSiO_4$ | 10 | 110 |
| * | 4-5 | 400 | 500 | 10 | — | — | 110 |
| * | 4-6 | 1000 | 500 | 10 | $Li_2MnSiO_4$ | 60 | 100 |
| | 4-7 | 900 | 500 | 10 | $Li_2MnSiO_4$ | 14 | 100 |
| | 4-8 | 600 | 500 | 10 | $Li_2MnSiO_4$ | 11 | 100 |
| | 4-9 | 500 | 500 | 10 | $Li_2MnSiO_4$ | 11 | 100 |
| * | 4-10 | 400 | 500 | 10 | — | — | 100 |
| * | 4-11 | 1000 | 500 | 10 | $Li_2(Fe_{0.85}Mn_{0.15})SiO_4$ | 90 | 95 |
| | 4-12 | 900 | 500 | 10 | $Li_2(Fe_{0.85}Mn_{0.15})SiO_4$ | 14 | 95 |
| | 4-13 | 600 | 500 | 10 | $Li_2(Fe_{0.85}Mn_{0.15})SiO_4$ | 13 | 95 |
| | 4-14 | 500 | 500 | 10 | $Li_2(Fe_{0.85}Mn_{0.15})SiO_4$ | 13 | 95 |
| * | 4-15 | 400 | 500 | 10 | — | — | 95 |

| | SAMPLE | BET SPECIFIC SURFACE AREA [m²/g] | CONTENT OF CARBON MATERIAL [% by mass] | PRESENCE OR ABSENCE OF SHOULDER PEAK | INITIAL CHARGE/DISCHARGE CAPACITY [mAh/g, 0.1 C] | RAPID CHARGE/DISCHARGE CAPACITY [mAh/g, 3.0 C] | ELECTROLYTE IMPREGNATION TIME [h] |
|---|---|---|---|---|---|---|---|
| * | 4-1 | 12 | 1.5 | NO | 150 | 45 | 9 |
| | 4-2 | 30 | 5 | YES | 250 | 75 | 7 |
| | 4-3 | 80 | 8 | YES | 270 | 86 | 4 |
| | 4-4 | 80 | 9 | YES | 270 | 86 | 4 |
| * | 4-5 | 90 | 10 | YES | 220 | 70 | 3 |
| * | 4-6 | 10 | 1.2 | NO | 180 | 58 | 10 |
| | 4-7 | 40 | 4 | YES | 255 | 82 | 5 |
| | 4-8 | 60 | 9 | YES | 270 | 86 | 4 |
| | 4-9 | 60 | 9 | YES | 270 | 81 | 4 |
| * | 4-10 | 70 | 11 | YES | 210 | 67 | 4 |
| * | 4-11 | 8 | 0.8 | NO | 170 | 51 | 8 |
| | 4-12 | 25 | 3 | YES | 250 | 80 | 6 |
| | 4-13 | 85 | 5 | YES | 275 | 33 | 4 |

TABLE 4-continued

| | | | | | | |
|---|---|---|---|---|---|---|
| | 4-14 | 85 | 5 | YES | 275 | 83 | 4 |
| * | 4-15 | 90 | 8 | YES | 220 | 66 | 4 |

* OUT OF RANGE OF THE PRESENT INVENTION

While the present invention has been explained referring to Examples obtained by the manufacturing method making use of spray pyrolysis, the present invention is not limited thereto, and a similar intermediate grain may be obtained alternatively by introducing the liquid droplets into a Ruthner type roasting furnace. Typically in the Ruthner type roasting furnace, liquefied natural gas is used as a fuel and partial pressure of oxygen is adjusted to approximately zero by controlling the air/fuel ratio. The processes for the obtained intermediate grains are same as those described above, and the same will apply also to the evaluation procedures of the sample.

Comparative Example

Iron lithium silicate was prepared by a solid phase reaction process. Source materials used for composing iron lithium silicate were lithium silicate ($Li_2SiO_3$) and iron (II) oxalate dihydrate ($FeC_2O_4 \cdot 2H_2O$), respectively weighed according to a compositional ratio of $Li_2FeSiO_4$, and were wet-mixed using methanol in a ball mill for 72 hours. The obtained mixture was sintered in the $1\%-H_2/N_2$ atmosphere at 800° C. for 48 hours. The product was then wet-ground in a planetary ball mill and conjugated with carbon by allowing glucose to impregnate thereinto, followed by heat treatment.

From analysis and evaluation conducted in the same way as described in Example 1, the sample thus obtained was found to contain 10% by mass of carbon material, but the composite grain was not found to have the sea-islands structure as seen in the present invention, and a BET specific surface area was 3 $m^2/g$. The circle-equivalent diameter of the iron lithium silicate crystal was found to be 50 nm, and no shoulder peak was found in the $C_{1S}$ peak by XPS. From measurement of battery characteristics in the form of coin battery, the initial charge/discharge capacity was found to be 110 mAh/g.

INDUSTRIAL APPLICABILITY

The present invention is applicable to the field of lithium ion secondary battery.

What is claimed is:

1. A cathode material for lithium ion secondary battery, wherein;
   the cathode material comprises a composite grains formed of a lithium silicate crystal represented by $Li_2MSiO_4$ (M represents one or more species of transition metal element including Fe and/or Mn) and a carbon material,
   the composite grains have a BET specific surface area of 25 to 110 $m^2/g$,
   the composite grains have a sea-islands structure in which the lithium silicate crystals are scattered like islands in the sea of the carbon material, and
   the islands have an average value of circle-equivalent diameter of smaller than 15 nm.

2. The cathode material for lithium ion secondary battery of claim 1, wherein the carbon material shows a $C_{1S}$ peak, observed by X-ray photoelectron spectroscopy, which contains an $SP^2$ peak, an $SP^3$ peak, and a shoulder peak located on a higher energy side of the $SP^2$ peak and the $SP^3$ peak.

3. The cathode material for lithium ion secondary battery of claim 1, wherein an average value of circle-equivalent diameters of the composite grains is 50 to 500 nm.

4. The cathode material for lithium ion secondary battery of claim 1, wherein a content of the carbon material in the composite grains is 2 to 25% by mass.

5. A cathode material for lithium ion secondary battery, wherein;
   the cathode material comprises composite grains, and
   the composite grains are obtained by pyrolyzing and reacting a solution, the solution containing at least compound(s) which contain elements composing a lithium silicate represented by $Li_2MSiO_4$ (M represents one or more species of transition metal element including Fe and/or Mn) and an organic compound which produces a carbon material while keeping the solution in a form of liquid droplets to produce an intermediate grain, and by heat treatment of the intermediate grain in an inert atmosphere or in a reductive atmosphere at 400° C. or higher and lower than a melting point of the lithium silicate.

6. The cathode material for lithium ion secondary battery of claim 5, wherein the composite grains are ground prior to the heat treatment.

7. A cathode member for lithium ion secondary battery, comprising the cathode material for lithium ion secondary battery of claim 1.

8. A lithium ion secondary battery comprising the cathode material for lithium ion secondary battery of claim 1.

9. A method for manufacturing a cathode material for lithium ion secondary battery, the method comprising a use of a composite grains, and
   wherein the composite grains are obtained by pyrolyzing and reacting a solution, the solution containing at least compound(s) which contain elements composing a lithium silicate represented by $Li_2MSiO_4$ (M represents one or more species of transition metal element) and an organic compound which produces a carbon material while keeping the solution in a form of liquid droplets to produce an intermediate grain, and by heat treatment of the intermediate grain in an inert atmosphere or in a reductive atmosphere at 400° C. or higher and lower than a melting point of the lithium silicate.

* * * * *